United States Patent
Shih et al.

(10) Patent No.: US 8,249,677 B2
(45) Date of Patent: Aug. 21, 2012

(54) HANDHELD ELECTRONIC DEVICE

(75) Inventors: Chin-Chung Shih, Taoyuan County (TW); Yi-Shen Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 64 days.

(21) Appl. No.: 12/824,236

(22) Filed: Jun. 28, 2010

(65) Prior Publication Data

US 2011/0164355 A1 Jul. 7, 2011

(30) Foreign Application Priority Data

Jan. 5, 2010 (TW) .............................. 99100080 A

(51) Int. Cl.
*H04M 1/00* (2006.01)
(52) U.S. Cl. ............... 455/575.4; 455/575.1; 455/575.8; 455/550.1
(58) Field of Classification Search ............... 455/550.1, 455/575.1, 575.4, 575.8
See application file for complete search history.

(56) References Cited

U.S. PATENT DOCUMENTS

2009/0163257 A1 * 6/2009 Vesamaki et al. .......... 455/575.4

FOREIGN PATENT DOCUMENTS

| EP | 1860710 | 11/2007 |
|---|---|---|
| EP | 2187600 | 5/2010 |
| WO | 2009-081354 | 7/2009 |

OTHER PUBLICATIONS

"1st Office Action of European Counterpart Application", issued on Oct. 18, 2010, p. 1-p. 6, in which the listed references were cited.
"Extended Search Report of European Counterpart Application", issued on Sep. 29, 2010, p. 1-p. 3, in which the listed references were cited.

* cited by examiner

*Primary Examiner* — Fayyaz Alam
(74) *Attorney, Agent, or Firm* — Jianq Chyun IP Office

(57) ABSTRACT

A handheld electronic device including a first body, a second body and a sliding mechanism is provided. The first body includes a first frame and a first cover connected to each other. The second body includes a second frame and a second cover connected to each other. The second frame is stacked over the first frame and partially located between the first frame and the first cover. The first frame is partially located between the second frame and the second cover. The sliding mechanism is disposed between the first body and the second body and is covered by the first cover and the second cover. The first frame and the second frame are slidable relative to each other through the sliding mechanism so that the first frame and the second frame are exposed by the second cover and the first cover, respectively.

6 Claims, 5 Drawing Sheets

HANDHELD ELECTRONIC DEVICE

CROSS-REFERENCE TO RELATED APPLICATION

This application claims the priority benefit of Taiwan application serial no. 99100080, filed on Jan. 5, 2010. The entirety of the above-mentioned patent application is hereby incorporated by reference herein and made a part of this specification.

BACKGROUND OF THE INVENTION

1. Field of the Invention

The present application relates to an electronic device. More particularly, the present application relates to a handheld electronic device.

2. Description of Related Art

A handheld electronic device refers to an electronic device that can be held and operated by a user, for example, a mobile phone, a multimedia player, a personal digital assistant (PDA), a handheld computer, a handheld game machine and a handheld satellite navigation device, etc. Such type of the electronic device generally has relatively small size and light weight for the user to carry around. Taking the mobile phone as an example, the earlier mobile phone has a bar-type design. However, to increase a portability of the mobile phone and maintain a screen size and a keyboard size of the mobile phone, a folder-type mobile phone and a slide-type mobile phone are developed.

Taking the slide-type mobile phone as an example, two bodies of a commonly used slide-type mobile phone can be vertically or horizontally moved relative to one another via a sliding mechanism, so that the two bodies can present various appearance modes, and the appearance modes can be used to match corresponding software functions, so as to achieve a plurality of operation modes of the slide-type mobile phone, for example, the operation modes of standby, phone call and message, etc.

However, when the two bodies are departed from each other to expose the sliding mechanism there between, a whole aesthetics of the slide-type mobile phone is influenced.

SUMMARY OF THE INVENTION

The present application is directed to a handheld electronic device, in which a sliding mechanism between two bodies of the handheld electronic device can be totally covered.

The present application provides a handheld electronic device including a first body, a second body and a sliding mechanism. The first body includes a first frame and a first cover. The first cover is connected to one end of the first frame and is stacked over the first frame, wherein the first cover and the first frame define a first containing space. The second body includes a second frame and a second cover. The second frame is stacked over the first frame and is partially located in the first containing space. The second cover is connected to one end of the second frame and is stacked over the second frame, wherein the second cover and the second frame define a second containing space. The first frame is partially located in the second containing space. The sliding mechanism is disposed between the first body and the second body and is covered by the first cover and the second cover, wherein the first body and the second body are slidable relative to each other through the sliding mechanism, so that the first frame and the second frame are respectively moved out from the second containing space and the first containing space.

According to the above description, the sliding mechanism is disposed between the first body and the second body, and the first body and the second body respectively have the first cover and the second cover used for covering the sliding mechanism. Therefore, when the first body and the second body are relatively slid through the sliding mechanism to depart from each other, the sliding mechanism can be covered by the first cover and the second cover without being exposed, so as to maintain a whole aesthetics of the handheld electronic device.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
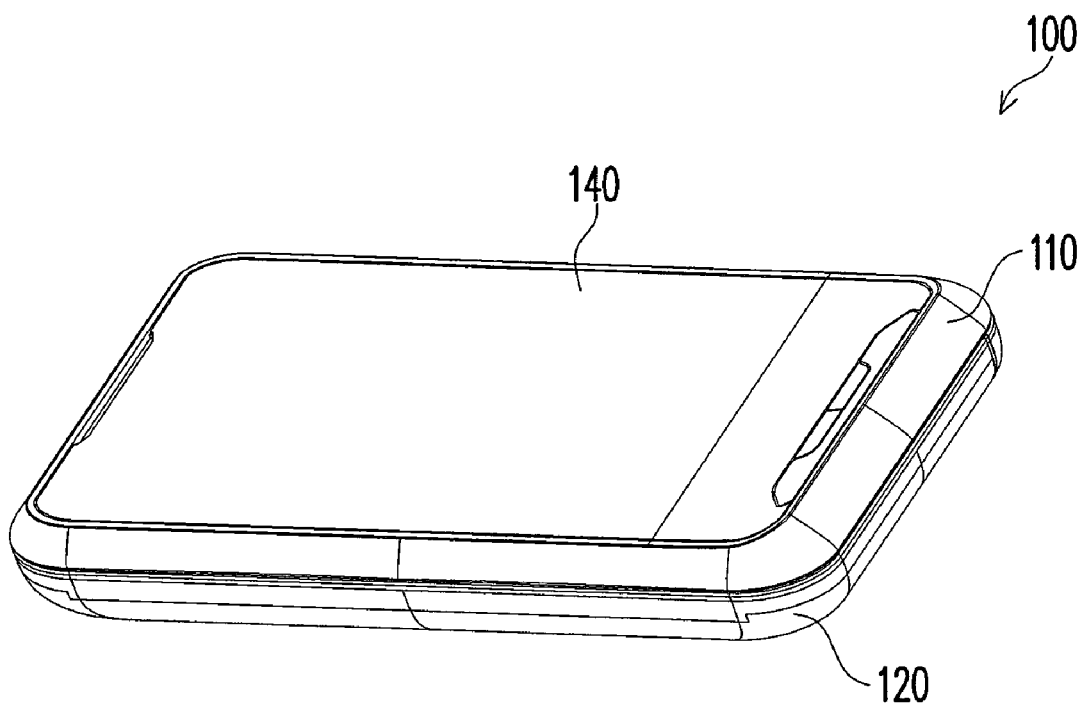
FIG. 1 is a perspective view of a handheld electronic device according to an embodiment of the present invention.
Figure 2:
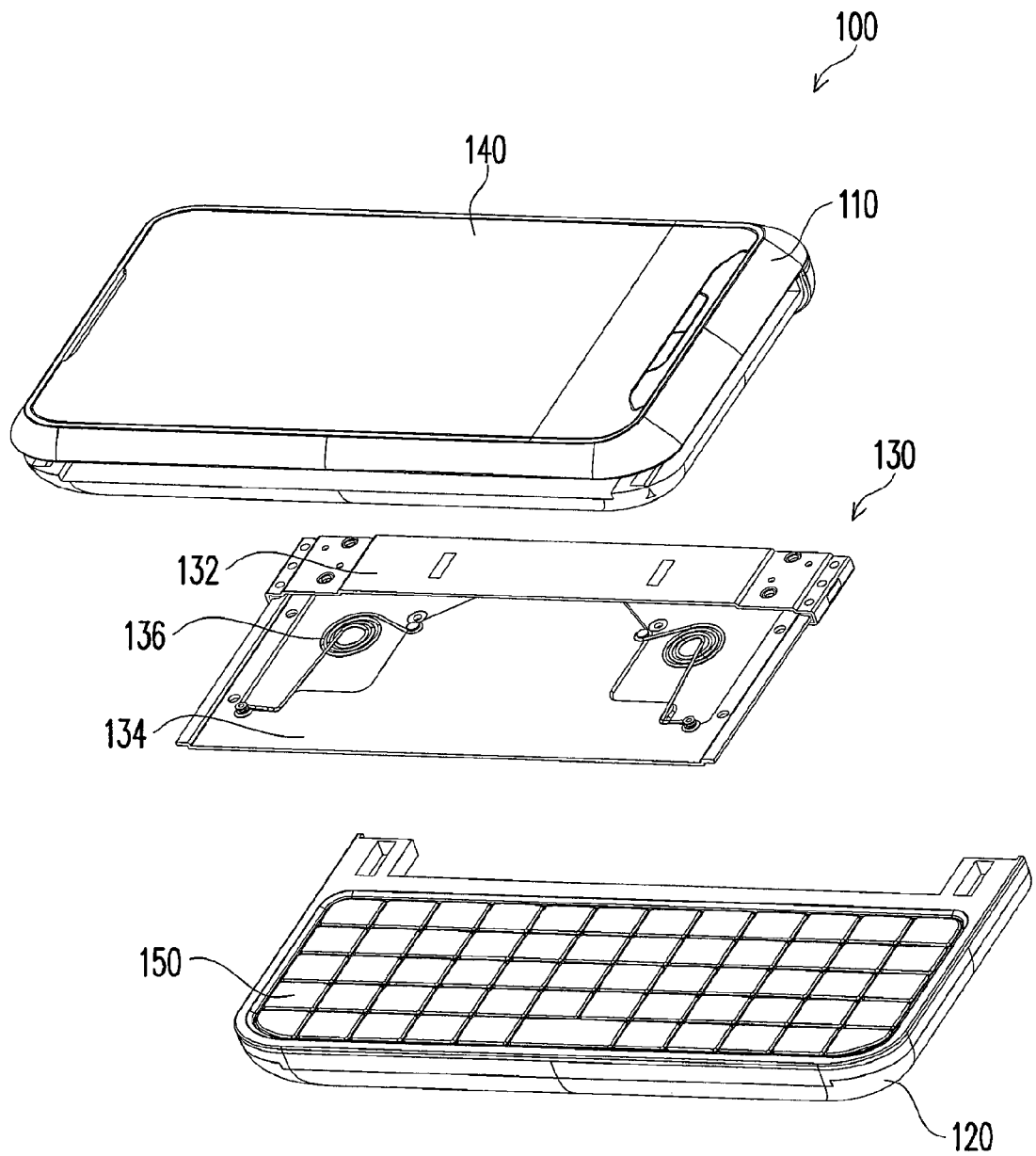
FIG. 2 is an exploded view of the handheld electronic device of FIG. 1.

FIG. 1 is a perspective view of a handheld electronic device according to an embodiment of the present invention. FIG. 2 is an exploded view of the handheld electronic device of FIG. 1. Referring to FIG. 1 and FIG. 2, in the present embodiment, the handheld electronic device 100 is, for example, a slide-type mobile phone, and the handheld electronic device 100 includes a first body 110, a second body 120 and a sliding mechanism 130. The first body 110 is stacked over the second body 120, and the sliding mechanism 130 is disposed between the first body 110 and the second body 120. In the present embodiment, the first body 110 of the handheld electronic device 100 has a display module 140, and the second body 120 has a keyboard module 150.

Figure 3A:
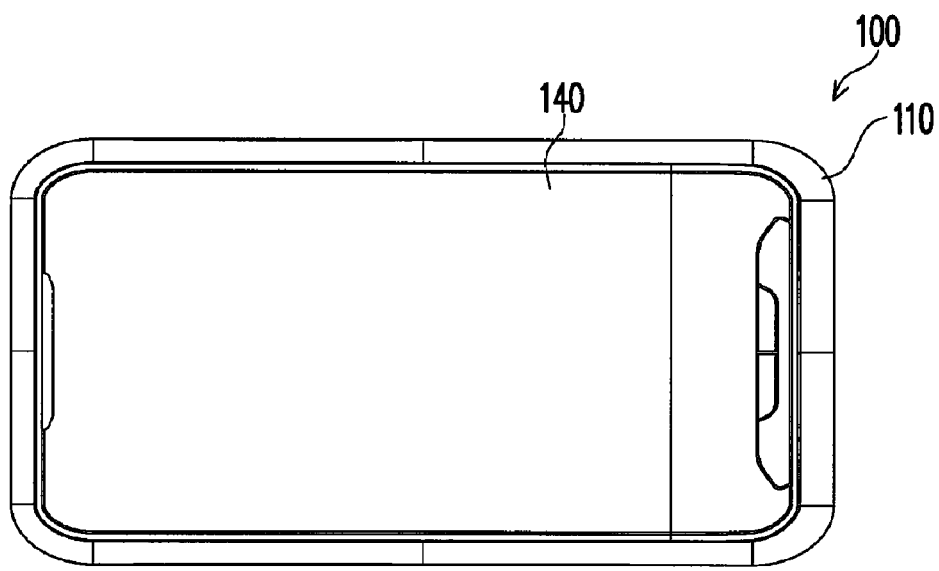
FIG. 3A and FIG. 3B show an operation state of the handheld electronic device of FIG. 1.
Figure 3B:
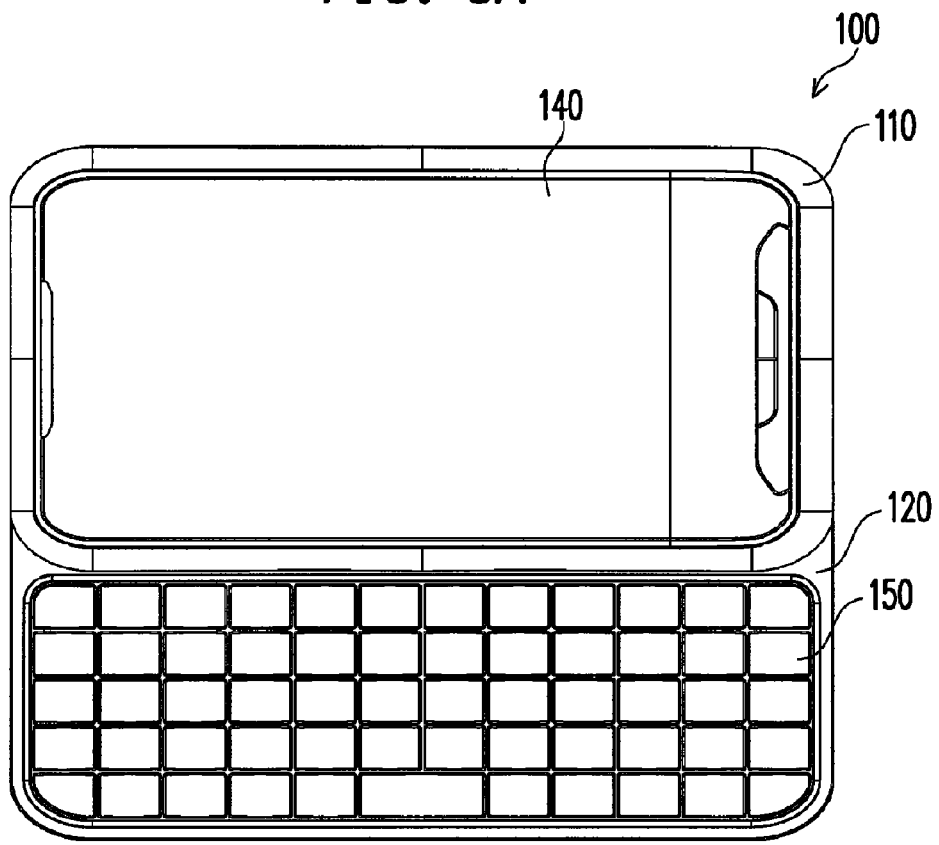

FIG. 3A and FIG. 3B show an operation state of the handheld electronic device of FIG. 1. Referring to FIG. 3A and FIG. 3B, the first body 110 and the second body 120 are slidable relative to each other through the sliding mechanism 130 from a state shown in FIG. 3A to a state shown in FIG. 3B, so that the keyboard module 150 located on the second body 120 is exposed by the first body 110 to facilitate user's operation.

Figure 4A:
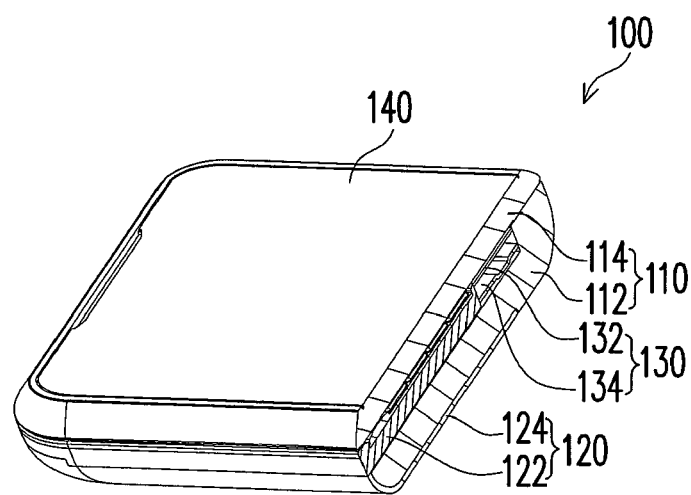
FIG. 4A and FIG. 4B are respectively partial perspective views of the handheld electronic device of FIG. 3A and FIG. 3B.
Figure 4B:
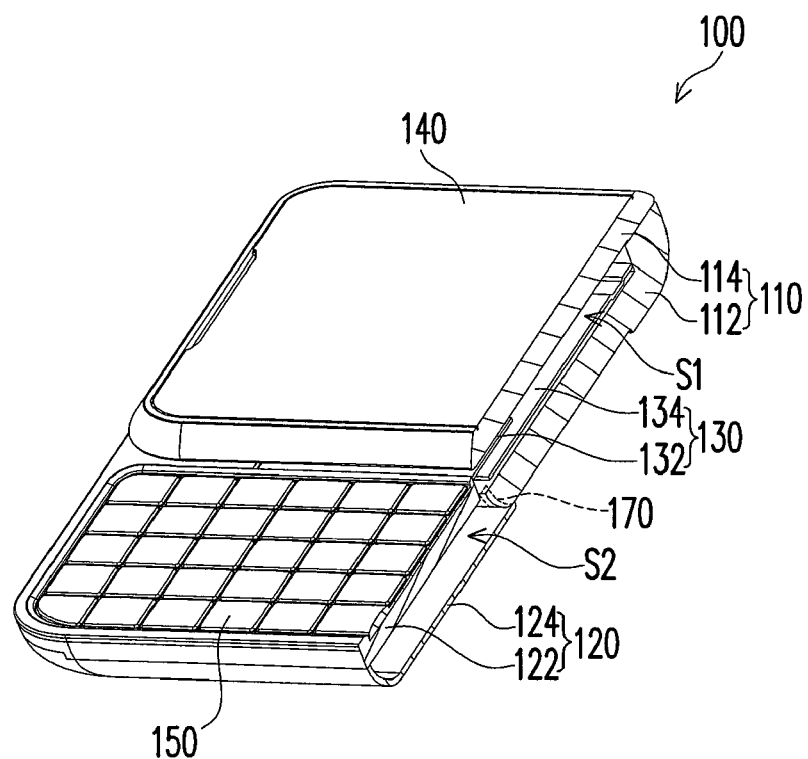

FIG. 4A and FIG. 4B are respectively partial perspective views of the handheld electronic device of FIG. 3A and FIG. 3B. Referring to FIG. 4A and FIG. 4B, in the present embodiment, the first body 110 includes a first frame 112 and a first cover 114, and the second body 120 includes a second frame 122 and a second cover 124. The first cover 114 is connected to one end of the first frame 112 and is stacked over the first frame 112, wherein the first cover 114 and the first frame 112 define a containing space S1. The second frame 122 is stacked over the first frame 112 and is partially located in the containing space S1. The second cover 124 is connected to one end of the second frame 122 and is stacked over the second frame 122, wherein the second cover 124 and the second frame 122 define a containing space S2, and the first frame 112 is partially located in the containing space S2.

The first body 110 and the second body 120 are slidable relative to each other through the sliding mechanism 130, so that the first frame 112 is moved out from the containing space S2, and the second frame 122 and the keyboard module 150 thereon are moved out from the containing space S1 (as shown in FIG. 4B). It should be noticed that regardless of the state shown in FIG. 4A or the state shown in FIG. 4B, the sliding mechanism 130 between the first body 110 and the second body 120 is covered by the first cover 114 and the second cover 124, so as to avoid exposing the sliding mechanism 130 to maintain the aesthetics of the handheld electronic device 100.

Referring to FIG. 2 and FIG. 4B again, in the present embodiment, the sliding mechanism 130 includes a first sliding member 132 and a second sliding member 134. The first sliding member 132 is fixed to the second frame 122, and the second sliding member 134 is fixed to the first frame 112, and is slidingly disposed on the first sliding member 132. In this way, when the user wants to use the keyboard module 150, the user can push the first body 110 to drive the first sliding member 132 to move relative to the second sliding member 134, so that the first body 110 and the second body 120 are relatively moved from the state shown in FIG. 3A to the state shown in FIG. 3B. Moreover, if the sliding mechanism 130 contains a plurality of elastic modules 136, and the elastic modules 136 are respectively connected to the first sliding member 132 and the second sliding member 134, the handheld electronic device 100 has a semi-auto sliding function.

Figure 5A:
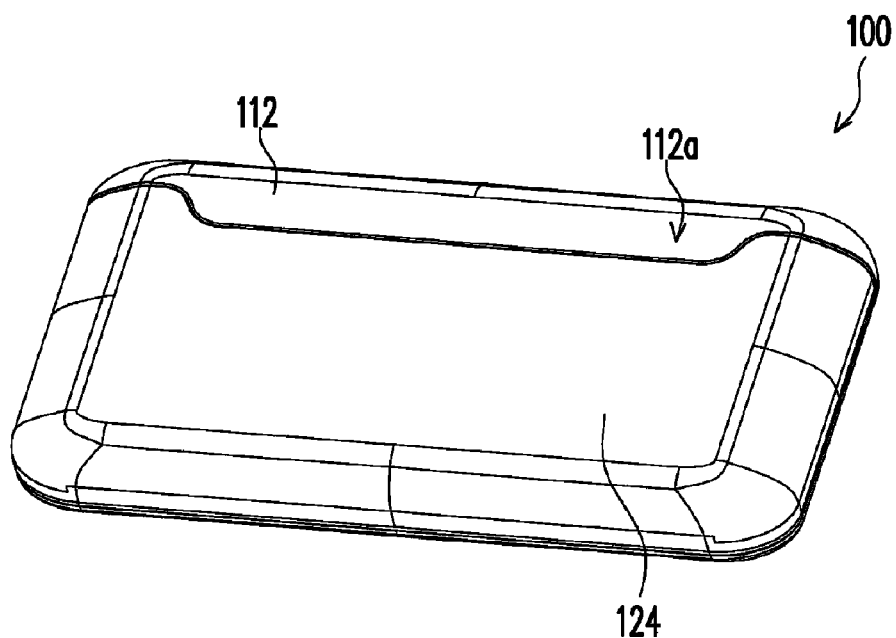
FIG. 5A and FIG. 5B are perspective views of the handheld electronic device of FIG. 3A and FIG. 3B according to another viewing angle.
Figure 5B:
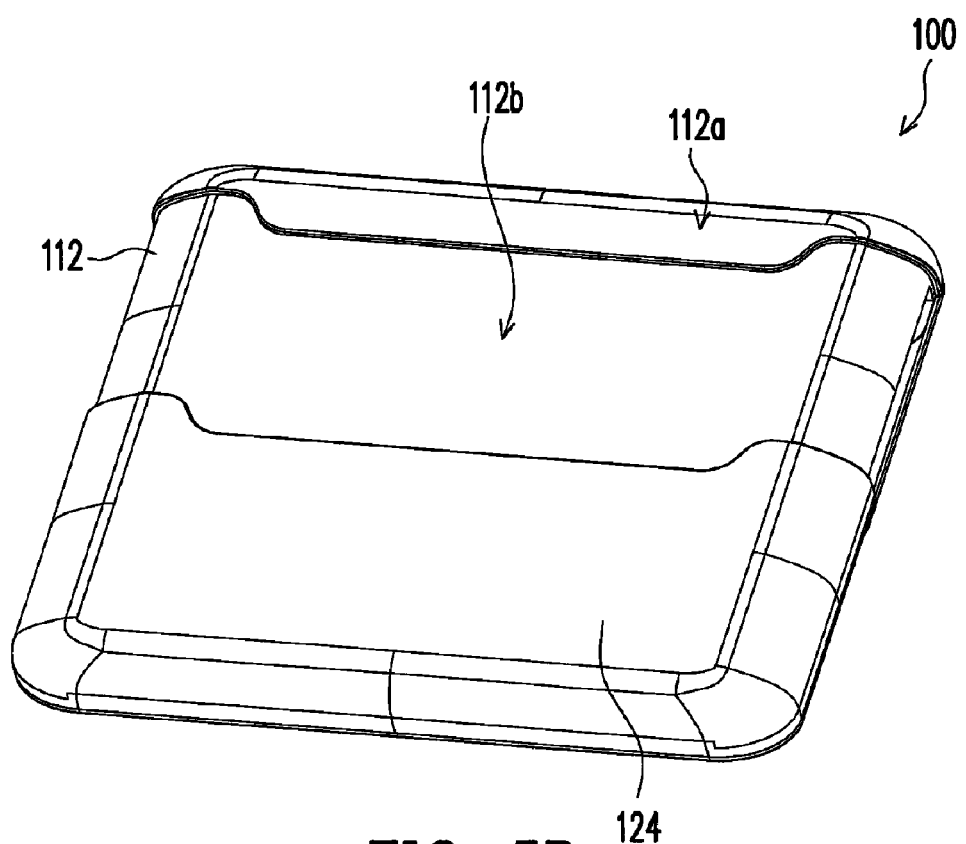

FIG. 5A and FIG. 5B are perspective views of the handheld electronic device of FIG. 3A and FIG. 3B according to another viewing angle. Referring to FIG. 5A and FIG. 5B, in the present embodiment, a surface of the first frame 112 facing to the second cover 124 has a protrusion region 112a and a concave region 112b adjacent to each other. The second cover 124 is suitable for covering the concave region 112b and fitting to the protrusion region 112a (shown in FIG. 5A), and when the first body 110 and the second body 120 are relatively slid to the state shown in FIG. 3B, the concave region 112b is exposed by the second cover 124 as that shown in FIG. 5B.

In this way, the concave region 112b can provide a space for the second cover 124 sliding along the first frame 112, and the protrusion region 112a can limit the second cover 124 to slide within a suitable range. Moreover, when the handheld electronic device 100 is in the state shown in FIG. 3A and FIG. 5A, fitting of the protrusion region 112a and the second cover 124 avails fixing relative positions of the first body 110 and the second body 120.

Referring to FIG. 4B, in the present embodiment, a loudspeaker 170 can be disposed on the first frame 112 and located in the containing space S2. In this way, when the first body 110 and the second body 120 are relatively slid to the state shown in FIG. 4B, the containing space S2 can serve as a sound box of the loudspeaker 170, so that the handheld electronic device 100 may have a better sound effect.

In summary, the sliding mechanism is disposed between the first body and the second body, and the first body and the second body respectively have the first cover and the second cover used for covering the sliding mechanism. Therefore, when the first body and the second body are relatively slid through the sliding mechanism to depart from each other, the sliding mechanism can be covered by the first cover and the second cover without being exposed, so as to maintain a whole aesthetics of the handheld electronic device. Moreover, the second cover and the second frame of the second body can define a containing space, and the first frame of the first body is partially located in the containing space. Therefore, a loudspeaker can be disposed on the first frame and located in the containing space, so that the containing space can serve as a sound box, so as to improve a sound effect of the handheld electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
    a first body, comprising:
        a first frame;
        a first cover connected to one end of the first frame and stacked over the first frame, wherein the first cover and the first frame define a first containing space;
    a second body, comprising:
        a second frame stacked over the first frame and partially located in the first containing space;
        a second cover connected to one end of the second frame and stacked over the second frame, wherein the second cover and the second frame define a second containing space, and the first frame is partially located in the second containing space; and
    a sliding mechanism disposed between the first body and the second body and covered by the first cover and the second cover, wherein the first body and the second body are slidable relative to each other through the sliding mechanism, so that the first frame and the second frame are respectively moved out from the second containing space and the first containing space, wherein the sliding mechanism, the first containing space and the second containing space are covered by the first body and the second body when the first frame and the second frame are respectively moved out from the second containing space and the first containing space.

2. The handheld electronic device as claimed in claim 1, further comprising:
    a display module disposed on the first cover.

3. The handheld electronic device as claimed in claim 2, further comprising:
    a keyboard module disposed on the second frame and located in the first containing space, wherein the first body and the second body are slidable relative to each other through the sliding mechanism, so that the keyboard module is moved out from the first containing space.

4. The handheld electronic device as claimed in claim 1, wherein the sliding mechanism comprises:
    a first sliding member fixed to the second frame; and
    a second sliding member fixed to the first frame and slidingly disposed on the first sliding member.

5. The handheld electronic device as claimed in claim 1, wherein a surface of the first frame facing to the second cover has a protrusion region and a concave region adjacent to each other, the second cover covers the concave region and fits to the protrusion region, and when the first body and the second body are relatively slid through the sliding mechanism, the concave region is exposed by the second cover.

6. The handheld electronic device as claimed in claim 1, further comprising:
    a loudspeaker disposed on the first frame and located in the second containing space.

* * * * *